United States Patent [19]

Stover

[11] Patent Number: 5,450,765
[45] Date of Patent: Sep. 19, 1995

[54] APPARATUS FOR PROVIDING SIGNAL COMMUNICATION BETWEEN THE INTERIOR AND EXTERIOR OF A PIPELINE

[75] Inventor: Kim R. Stover, Tulsa, Okla.

[73] Assignee: TDW Delaware, Inc., Wilmington, Del.

[21] Appl. No.: 204,056

[22] Filed: Mar. 1, 1994

[51] Int. Cl.6 .............................................. F16L 55/10
[52] U.S. Cl. .................................. 73/866.5; 174/151; 174/65 R; 174/77 R; 174/99 R; 138/90
[58] Field of Search ............. 174/151, 152 G, 153 G, 174/153 R, 65 R, 65 G, 65 SS, 77 R, 93, 99 R, 19; 374/147, 148; 138/90, 104; 248/56; 285/93; 73/86, 866.5, 756, 61.43, 61.46–61.47

[56] References Cited

U.S. PATENT DOCUMENTS

| | | |
|---|---|---|
| 1,541,756 | 1/1924 | Williams . |
| 1,851,939 | 10/1929 | Williams . |
| 1,851,940 | 11/1929 | Williams . |
| 3,135,535 | 6/1964 | Shepard ............................. 285/137 |
| 3,314,030 | 4/1967 | Mallett et al. ....................... 336/58 |
| 3,441,662 | 4/1969 | Augenstein et al. ................. 174/151 |
| 3,697,089 | 10/1972 | Jacisin et al. ....................... 277/35 |
| 3,766,947 | 10/1973 | Osburn ............................... 138/89 |
| 3,772,637 | 11/1973 | Faullus et al. ...................... 339/102 |
| 4,267,401 | 5/1981 | Wilkinson ............................ 174/77 |
| 4,313,030 | 1/1982 | Bosch ................................. 174/151 |
| 4,387,740 | 6/1983 | Vanzant .............................. 138/89 |
| 4,454,381 | 6/1984 | Ito et al. ............................. 174/151 |
| 4,465,104 | 8/1984 | Wittman et al. ..................... 138/89 |
| 4,691,728 | 9/1987 | Mathison ............................. 137/15 |
| 4,693,278 | 9/1987 | Wilson et al. ....................... 138/89 |
| 5,092,375 | 3/1992 | Landers .............................. 141/138 |
| 5,235,138 | 8/1993 | Shah et al. .......................... 174/151 |
| 5,278,357 | 1/1994 | Yamanashi .......................... 174/151 |

Primary Examiner—Leo P. Picard
Assistant Examiner—Paramita Ghosh
Attorney, Agent, or Firm—Head and Johnson

[57] ABSTRACT

An apparatus is providing for signal communication between the interior and exterior of a pipeline. A fitting is secured to the external surface of a pipeline, the fitting having a branch opening therein communicating with the pipeline interior. A plug member is sealably positioned in the branch opening, the plug member having a passageway therethrough. At least one conductor is received in the plug member passageway providing an apparatus to conduct an electrical signal from within to the exterior of the pipeline. A potting compound fills the passageway surrounding the conductor to seal the conductor in the plug against the leakage of liquids or gases.

4 Claims, 3 Drawing Sheets

APPARATUS FOR PROVIDING SIGNAL COMMUNICATION BETWEEN THE INTERIOR AND EXTERIOR OF A PIPELINE

CROSS-REFERENCE TO RELATED APPLICATIONS

The present disclosure is not related to any pending application.

REFERENCE TO MICROFICHE APPENDIX

The present disclosure is not related to any microfiche appendix.

BACKGROUND OF THE INVENTION

This invention relates to apparatus for use in providing signal communication between the interior and the exterior of a pipeline. In the operation of a pipeline, it is frequently important to obtain information as to conditions in the interior of the pipeline. Examples of such applications are: (1) pig signaling devices, that is, devices used to signal the passage of a pig apparatus through the pipeline; (2) corrosion probes, that is, devices to detect and/or measure the rate of corrosion occurring in the pipeline; (3) analysis of the contents flowing through the pipeline such as the amount of water contained in petroleum products or the specific gravity of the products; (4) the temperature of the fluid or gas flowing through the pipeline; (5) the pressure within the pipeline; (6) fluid or gas flow rates; and (7) benchmark systems which may include frequency channels that can be sold to in-line inspection companies.

Others have provided permanently mounted devices for passing a conductor from one side to the other of a pressure bearing wall. For information on how conductors can be extended through a pressure separating wall, see the following U.S. Pat. Nos. 1,541,756; 1,851,939; 1,851,940; 3,135,535; 3,314,030; 3,697,089; 3,772,637; 4,267,401; 4,609,209; 5,235,138 and 5,092,375.

For examples of the use of conductors in pipelines see U.S. Pat. Nos. 4,691,728 and 4,465,104.

These prior art references illustrate and describe various means of passing conductors from one side to another of a pressure barrier. However, none of the references describe a convenient and effective way for providing signal communication between the interior of a pipeline and the exterior arranged so that the instrumentation positioned within a pipeline can be inspected or changed while the pipeline is under pressure. The ability to remove an electrical device, whether signal generating or signal receiving, from the interior of a pipeline and repair or replace it while the pipeline is under pressure can be very valuable to a pipeline operator. This ability reduces the costs that are encountered when it is necessary to depressurize a pipeline in order to provide new or different signal or receiving devices.

Stating it another way, this invention provides an apparatus for conveying signal communication from within to the exterior of the pipeline in a manner that enables the operator of a pipeline to have access to the interior of the pipeline as often as desired and without the necessity to discontinue normal operations of the pipeline.

BRIEF SUMMARY OF THE INVENTION

An apparatus for providing signal communication between the interior of a pipeline and the exterior is provided. A fitting is secured to the exterior surface of a pipeline, the fitting has a branch opening therein that communicates with the interior of the pipeline. The branch opening can be obtained by drilling a hole in the pipeline sidewall at a time when the pipeline is not subject to internal fluid or gas pressure. Alternatively, means are available for providing fitting for a pipeline and a branch opening therein while the pipeline is under pressure, sometimes referred to as "hot tapping". For information relating to tapping a pipeline to provide communication with the interior of the pipeline while it is under pressure, reference may be had to U.S. Pat. No. 3,614,252.

In the practices of this invention a fitting is attached to the pipeline, the fitting having a branch opening therein that communicates with the interior of the pipeline. The branch opening in the fitting has a cylindrical internal surface.

A plug member is removably positioned in the branch fitting for sealably closing the branch opening. A preferred way of sealing the exterior circumferential surface of the plug member to the internal cylindrical surface of the fitting is an o-ring positioned in a circumferential groove in the plug member. The plug member must be secured in the branch opening to resist pressure from within the pipeline. This can be accomplished by using a plurality of locking elements extending radially from the branch fitting. The inner ends of the locking elements, when the locking elements are inwardly axially and threadably advanced, engage a groove in the plug member. This system allows the plug member to be extracted from the fitting by retracting the locking elements.

In the preferred practice of the invention, the fitting that is secured to the external surface of a pipe having the cylindrical branch opening therein terminates at the upper end with an enlarged external diameter flange portion surrounding the branch opening. A flange disc can then be used to seal the plug member. The flange disc is bolted to the fitting member circumferential flange. The flange disc has an opening in it that receives the conductor or conductors previously mentioned through the opening. The opening is closed by a potting compound.

The concept of the invention wherein a flange disc is employed permits the conductor to be provided with sufficient length so that it can be coiled or folded in the space between the plug member and the flange disc. The flange disc can be removed and laid aside to permit inspection of the plug member and to repair the plug member as necessary. When in sealed condition on top of the fitting, the flange disc can function as the primary closure for the pipeline.

A better understanding of the invention will be obtained from the following description of the preferred embodiment taken in conjunction with the attached drawings.

DETAILED DESCRIPTION OF THE PREFERRED EMBODIMENT

Figure 1:
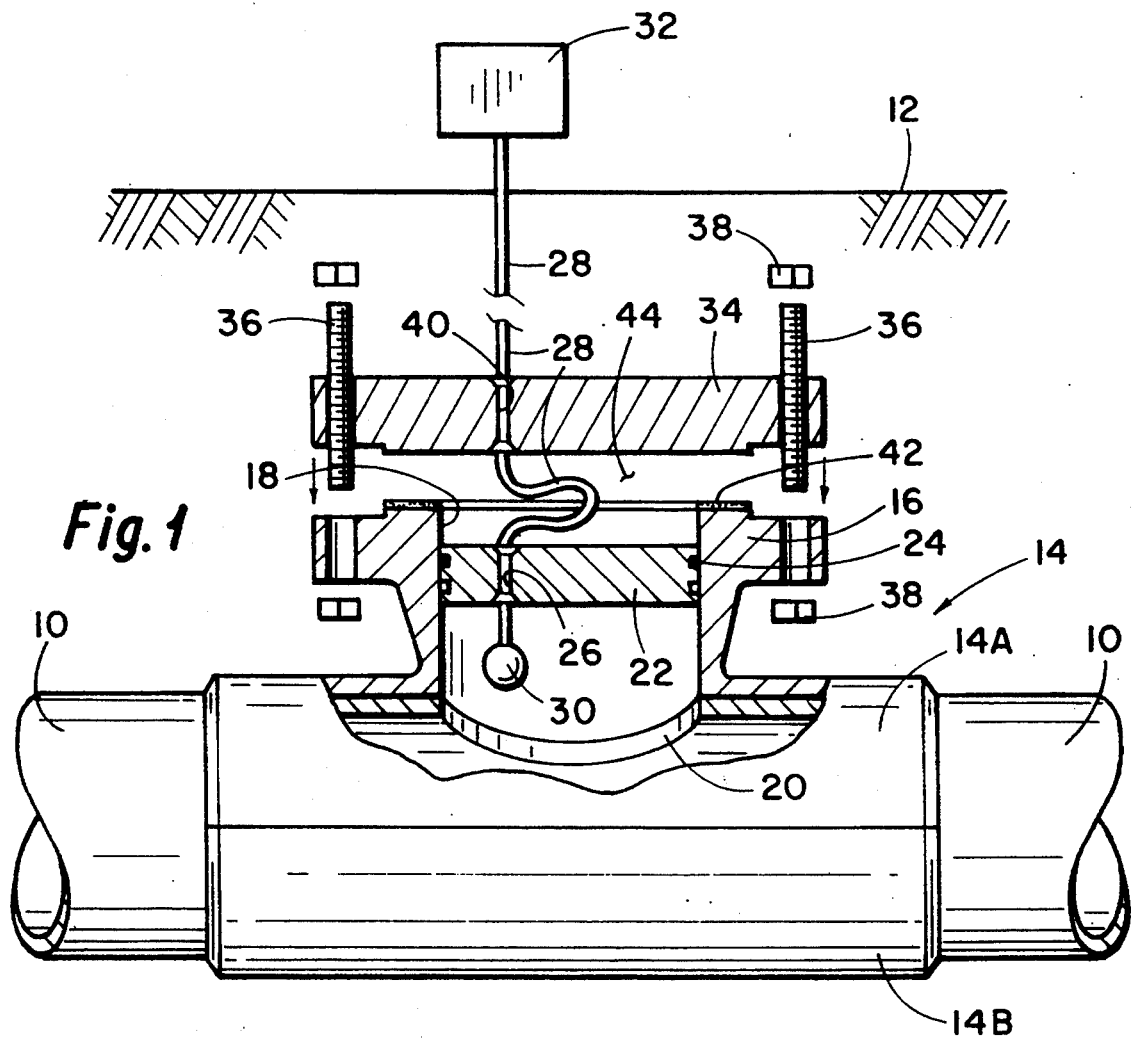
FIG. 1 is an elevational view, shown partially cut away, of a fitting secured on a pipeline. The fitting has a branch opening communicating with a hole of the pipeline. A plug is positioned in the branch fitting with means to provide electrical communication with a device positioned within the pipeline.

Referring to FIG. 1, the basic concept of the invention is illustrated. A pipeline is indicated by the numeral 10 of the type that is typically buried beneath the earth's surface 12. An object of this invention is to provide electrical signal communication between the interior and exterior of pipeline 10. For this purpose a fitting, generally indicated by the numeral 14, is attached to the exterior of the pipeline. The fitting has an upper portion 14A and a lower portion 14B. When pipeline 10 is made of steel portions 14A and 14B may be welded to the exterior of the pipeline. Upper portion 14A includes an integral flange portion 16 having a branch opening 18 therein, the branch opening providing an internal cylindrical surface.

A hole 20 is formed in pipeline 10 such as by using a hole saw. This can be accomplished directly through the branch opening 18 while the pipeline is under pressure using a hot tapping technique as illustrated and described in U.S. Pat. No. 3,614,252, that is incorporated herein by reference.

Positioned within branch opening cylindrical surface 18 is a plug member 22, the preferred embodiments of which will be described subsequently.

The function of plug member 22 is to sealably close branch opening 18 which can be accomplished employing an o-ring 24 that is positioned within a circumferential groove in the exterior cylindrical surface of the plug member.

Plug member 22 has at least one opening 26 therein. Received in opening 26 is a conductor 28. The portion of the conductor below plug member 22 is attached to a sensor 30 while the conductor exterior of pipeline 10 is attached to instrumentation 32 located at the earth's surface.

Sensor 30 may be a device that is used to indicate the passage of a pig apparatus through the pipeline. It may be a corrosion probe that provides information as to the rate of corrosion occurring within the pipeline. It may be a device that analyses the contents flowing through the pipeline. For instance, if the pipeline carries primarily petroleum products, sensor 30 can be a device to indicate the amount of water in the fluid stream. Sensor 30 may be a device for measuring the temperature or the rate of flow of fluid or gas through the pipeline. In another application, sensor 30 may measure the pressure within the pipeline. In addition, the sensor 30 may be a benchmark system which may include frequency channels that can be sold to in-line inspection companies. These are merely examples of the possibilities of use of a sensor 30 that is exposed to the interior of pipeline 10. By "sensor" is meant to include multiple sensing devices so that one, two, three or more different parameters may be detected within the pipeline and signals from each passed by conductor 28 to instrumentation 32. By "conductor", as identified by numeral 28, is intended to mean either a single or multiple path conductor.

Removably positionable on fitting flange portion 16 is a flange disc 34. Flange 16 and disc 34 have openings in their parameters that align with each other to receive bolts 36 and nuts 38 by which flange 34 can be positioned on fitting 14. Flange 34 is generally of the type that is usually referred to as a "blind" flange, however, at least one opening 40 is provided in the flange that receives conductor 28. Opening 26 in plug member 22 and opening 40 in flange disc 34 are both rendered leakproof by the application of a sealing compound in a manner to be described subsequently.

A toroidal gasket 42 is positioned between the upper end of flange portion 16 and flange disc 34. This gasket ensures a leakproof seal between these two elements when they are held together by bolts 36 and nuts 38.

As seen in FIG. 1, conductor 28 is looped in space 44 provided between the upper end of plug member 22 and the bottom of flange disc 34. This extra length of conductor 28 allows flange disc 34 to be removed so that plug member 22 may be inspected without disturbing conductor 28. Further, the loop of extra conductor 28 within space 44 allows flange disc 34 to be moved aside if work needs to be performed on plug member 22.

Figure 2:
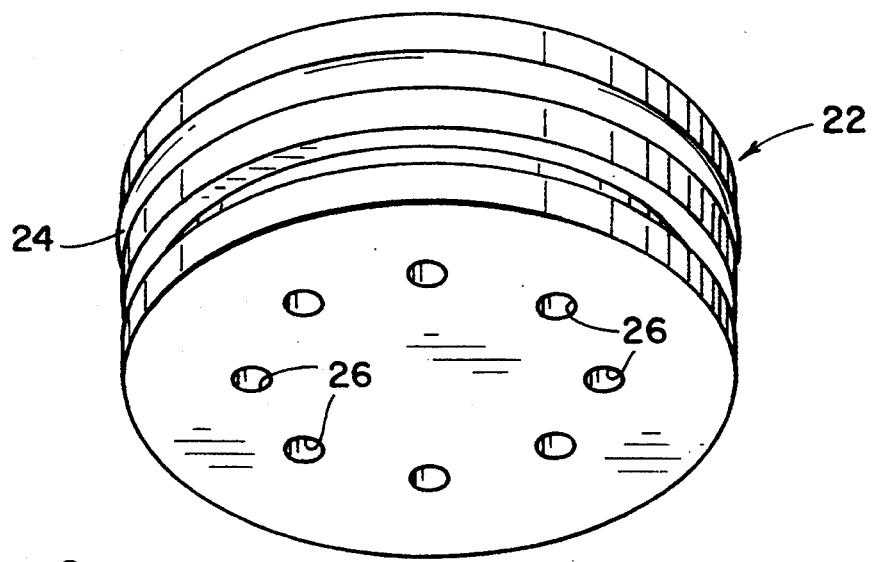
FIG. 2 is an isometric view showing the bottom of a plug member and openings therethrough as used to receive conductors.

FIG. 2 is a bottom isometric view of one embodiment of a plug member 22. This figure shows a plurality of openings 26, whereas only one is shown in FIG. 1. A plurality of openings can be employed to accept a plurality of conductors where several instruments are to be positioned within the interior environment of the pipeline.

Figure 3:
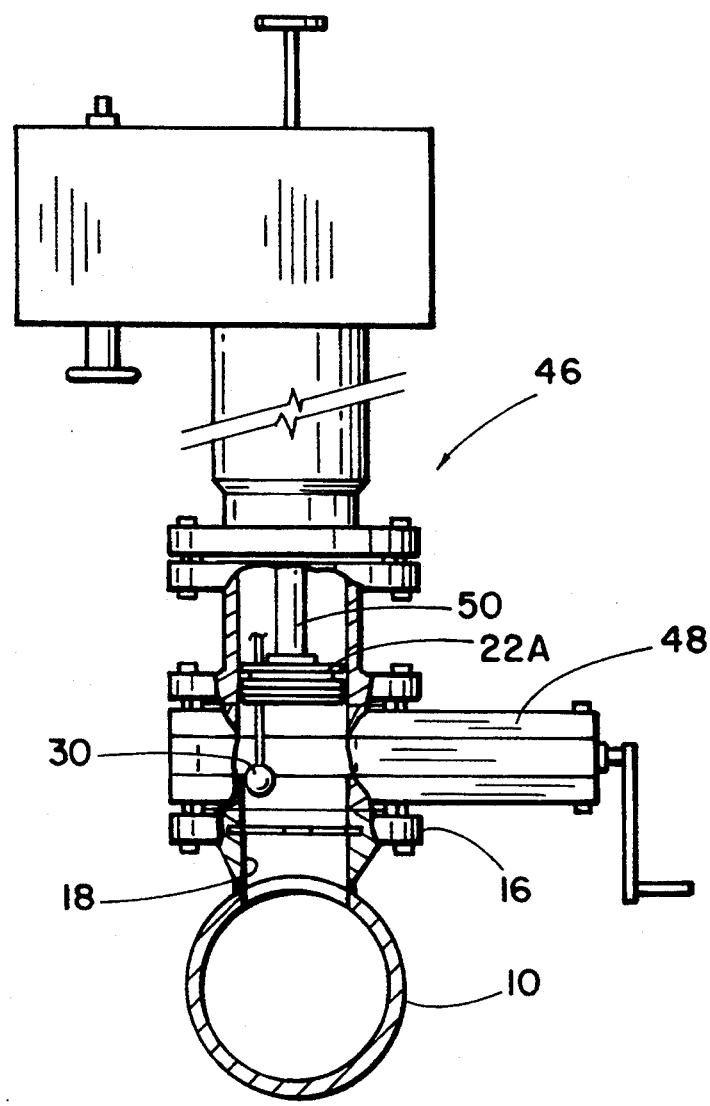
FIG. 3 is a reduced scale elevational view of an apparatus for installing or removing a plug member from a branch fitting.
Figure 4:
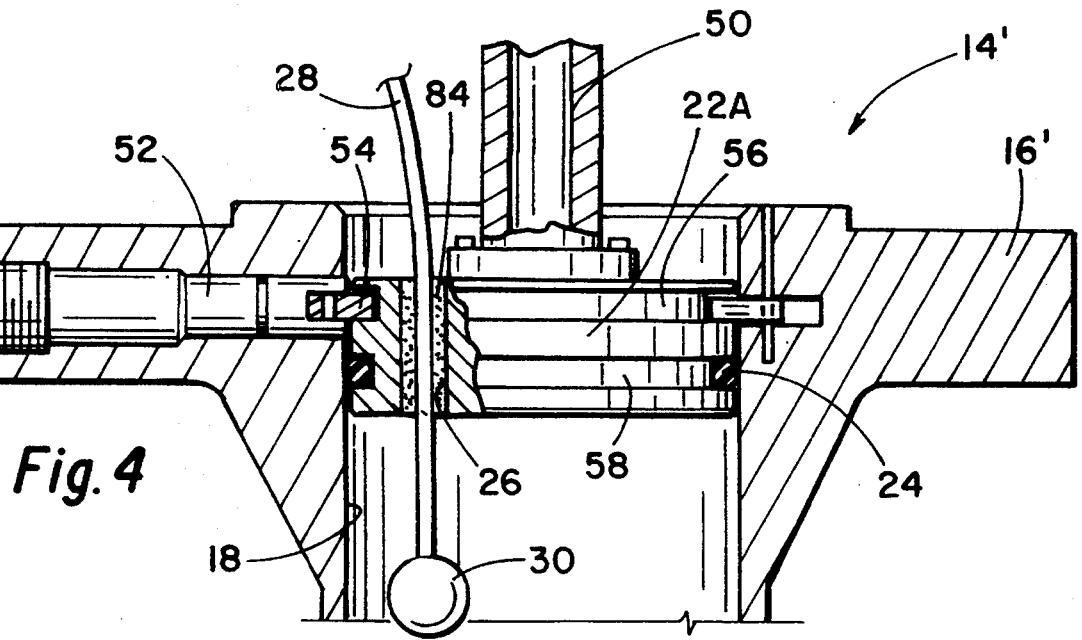
FIG. 4 is an enlarged elevational cross-sectional view of the upper portion of a fitting showing a plug positioned in the branch opening therein. A conductor passes therethrough the plug. One means of removably retaining the plug in the fitting is illustrated.

FIG. 3 illustrates a method of removing a plug member 22 and sensor 30. A plug replacement machine is generally indicated by the numeral 46 and includes a sandwich valve 48. The valve 48 may be attached to flange 16 and opened so that a shaft 50 from machine 46 can be extended downwardly to engage plug member 22A. The plug member can be withdrawn and valve 48 closed. Thereafter, the upper portion of the plug replacement machine may be removed from above valve 48, thereby permitting access to plug member 22A and sensor 30. This will permit either the plug member itself to be replaced or sensor 30 to be replaced. After these items are replaced, the upper portion of the plug replacement machine is reattached to the top of sandwich valve 48 and the plug member and replacement sensor 30 can be positioned within the branch opening. After plug member 22A is in position, as shown in FIG. 4 wherein it sealably closes the branch opening 18, the plug replacement machine 46 including valve 48 may be removed. Thereafter a flange disc of the type illustrated by the numeral 34 in FIG. 1 may be installed on top of fitting 14.

The concept of removably installing and replacing plug member 22A is fully disclosed in U.S. Pat. No. 3,766,947 which is made a part hereof by reference.

FIG. 4 is a fragmentary enlarged view of an alternate embodiment of the fitting, identified by the numeral 14'.

In this embodiment, the flange portion 16' of fitting 14' has inwardly extendable threadable positioners 52 that have at their inner ends locking elements 54. These locking elements can be extended into an upper circumferential groove 56 formed on the exterior surface of plug member 22A. A plurality of threaded positioners 52 and locking elements 54 are formed within flange portion 16' and radially spaced so that when the threaded positioners are all inwardly advanced plug 22A is secured within the branch opening 18'. When the threaded positioners 52 are outwardly withdrawn, locking elements 54 are moved out of the upper circumferential groove 56 allowing plug member 22A to be removed out of branch opening 18'.

In the embodiment of FIG. 4 0-ring 24 is in a lower circumferential groove 58 to provide sealed contact with branch opening 18'.

The method of sealably and removably retaining a plug member 22A within branch opening 18 as illustrated in FIG. 4 is merely exemplary. The use of locking elements 54 and threaded positioners 52 are described in more detail in U.S. Pat. No. 3,766,947, previously referenced, which is incorporated herein by reference.

Figure 5:
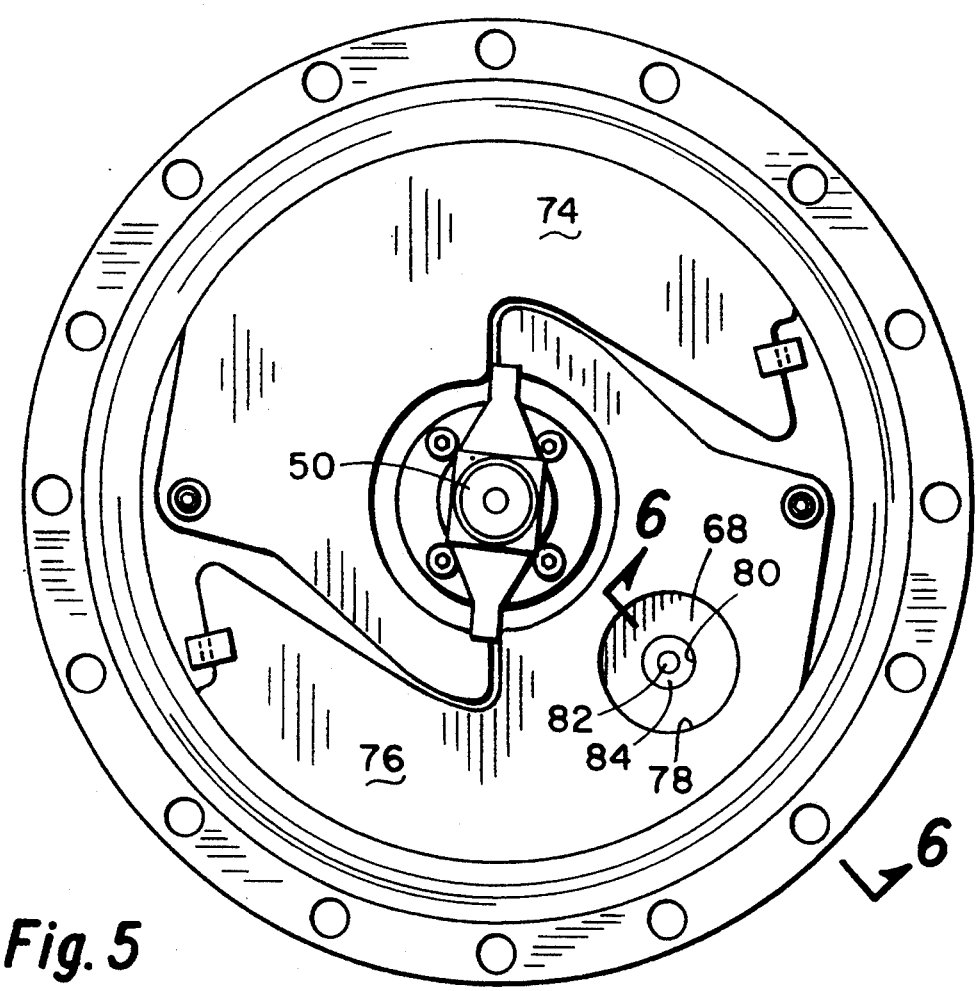
FIG. 5 is a top view of an alternate form of a plug positioned within a branch opening in a fitting. The plug has a conductor passing through it. This Figure illustrates a type of plug that may be locked in position utilizing radially positionable plates.
Figure 6:
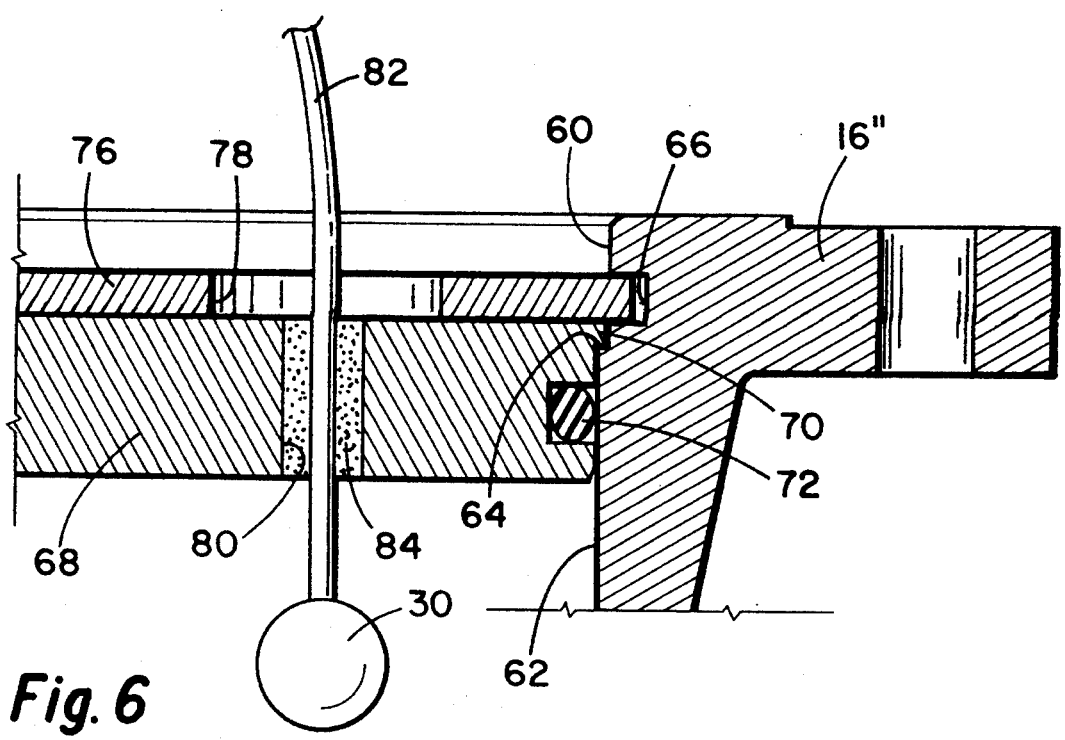
FIG. 6 is an enlarged fragmentary cross-sectional view taken along the line 6—6 of FIG. 5 showing more details of the plug and the arrangement for retaining it in the fitting. The plug has a conductor therethrough for providing electrical signal transmission between the interior and exterior of a pipeline.

FIGS. 5 and 6, to which reference will now be made, illustrate another embodiment including means of retaining the plug member within the branch opening of a pipeline fitting by means entirely internally of the fitting. In this arrangement, as shown in FIG. 6, the flange portion 16" of the fitting has two different internal diameter portions defining the branch opening, that is, a upper larger internal diameter portion 60 and a lower smaller internal diameter portion 62. The difference in the diameters of these two portions provides a radially extending circumferential ledge 64. Further, upper larger diameter portion 60 of the branch opening has a circumferential groove 66 therein.

The flange member 68 employed in this embodiment has an upper large external diameter portion 70 that seats on the circumferential ledge 64 by which the plug member is accurately positioned within the interior of the fitting. O-ring 72 provides pressure seal for the plug member as previously described with reference to FIG. 4.

To removably retain plug member 68 in position, as shown in FIG. 5, there is mounted on the upper surface of the plug member two opposed cam plates 74 and 76. Cam plate 76 has a large diameter opening 78 that exposes the top surface of plug member 68. This portion of the plug member has an opening 80 therethrough that receives a conductor 82. Potting compound 84 seals the conductor within opening 80.

The method of removably positioning a plug member in a branch opening of the type shown in FIGS. 5 and 6 is fully described in U.S. Pat. No. 4,387,740, that is incorporated herein by reference. The addition made in this disclosure is the provision of opening 78 in cam plate 76 so that conductor 82 may be passed through the plug member without interfering with the operation of cam plates 74 and 76. When the cam plates are radially inwardly withdrawn towards each other plug member 68 may be positioned into the branch opening in the fitting or it may be withdrawn in the way previously described with reference to FIG. 3. By employing a cam-flange plug member as described in U.S. Pat. No. 4,387,740 while employing the principles of this disclosure the plug member may be provided that can be inserted into or removed from a fitting attached to a pipeline while the pipeline is under pressure to install a sensor 30 or replace it.

The embodiment of FIGS. 3 and 4 as well as the embodiment of FIGS. 5 and 6 can employ the use of a flange disc 34 as shown in FIG. 1 to seal the fitting after a sensor has been installed in the same manner as described with reference to FIG. 1.

FIGS. 4 and 5 show two different ways to lock plug member 22 in place within fitting 14. Another method of practicing the invention includes the arrangement in which branch opening 18 in fitting 14 is internally threaded and plug member 22 has threads on its cylindrical surface. In this arrangement (not illustrated) the plug member can be threaded in position within the fitting branch opening. When access to the interior of fitting 14 is required, the plug can be unscrewed.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. Apparatus for providing signal communication between the interior of a pipeline and the exterior thereof comprising:

a fitting secured to the external surface of a pipeline having a branch opening therein and having a fitting flange surrounding the branch opening, the branch opening communicating with the interior of said pipeline;

a plug member removably positioned in said fitting branch opening for sealably closing said branch opening, the plug member having a passageway therethrough;

at least one conductor received in said plug member passageway providing means to provide an electrical signal from within the interior to the exterior of said pipeline;

means of sealing said passageway having said conductor therein;

means of removably sealing said plug member to said fitting in said branch opening;

a flange disc removably receivable on said fitting flange providing means to sealably close said branch opening and thereby provide a closed space between said plug member and the flange disc, the flange disc having a conductor passageway therethrough receiving said at least one conductor that is received in said plug passageway; and means of sealing said flange disc conductor passageway, said at least one conductor being in part folded in said closed space between said plug member and said flange disc whereby said flange disc may be removed from said flange to leave said plug member fully exposed.

2. Apparatus for providing signal communication between the interior of a pipeline and the exterior thereof according to claim 1 wherein said fitting branch opening has an internal cylindrical surface of two different internal diameters providing a circumferential ledge and wherein said plug member has an external cylindrical surface of two different diameters providing a lip portion whereby said plug member may be positioned in said fitting branch opening with said lip portion in engagement with said circumferential ledge.

3. Apparatus for providing signal communication between the interior and the exterior of a pipeline according to claim 1 wherein said branch opening is formed, at least in part, by an internal cylindrical surface and wherein said plug member has an external cylindrical surface having a circumferential groove therein and including:

a toroidal elastomeric gasket member received in said circumferential groove.

4. Apparatus for providing signal communication between the interior and the exterior of a pipeline according to claim 1 wherein said means of removably sealing said plug member to said fitting branch opening includes means of mechanically locking said plug member to said fitting.

* * * * *